United States Patent [19]
Boss et al.

[11] Patent Number: 5,635,069
[45] Date of Patent: Jun. 3, 1997

[54] PROCESS FOR TREATING A WASTE SLUDGE OF BIOLOGICAL SOLIDS

[76] Inventors: Edward E. Boss, 13700 Veterans Memorial Dr., Suite 380, Houston, Tex. 77014-1017; Samuel L. Shepherd, 5211 Mulberry Grove, Kingwood, Tex. 77345

[21] Appl. No.: 501,157

[22] Filed: Jul. 11, 1995

Related U.S. Application Data

[63] Continuation-in-part of Ser. No. 278,902, Jul. 22, 1994, abandoned.

[51] Int. Cl.$^6$ ........................................ C02F 11/14
[52] U.S. Cl. .................. 210/609; 210/750; 210/752; 210/764; 210/765; 210/766; 210/770
[58] Field of Search .............................. 210/609, 710, 210/737, 741, 742, 750, 751, 752, 761, 765, 766, 768, 770, 764

[56] References Cited

U.S. PATENT DOCUMENTS

| | | | |
|---|---|---|---|
| 4,038,180 | 7/1977 | Talbert | 210/737 |
| 4,256,630 | 3/1981 | Fremont | 210/710 |
| 4,500,428 | 2/1985 | Lynch et al. | 210/609 |
| 4,909,899 | 3/1990 | Kiiskilä | 159/47.3 |
| 4,988,442 | 1/1991 | Highsmith et al. | 210/609 |
| 5,145,581 | 9/1992 | Novy et al. | 210/609 |
| 5,196,043 | 3/1993 | Wurtz | 210/609 |
| 5,275,733 | 1/1994 | Burnham | 210/752 |
| 5,378,257 | 1/1995 | Higashida | 210/770 |
| 5,482,528 | 1/1996 | Angell et al. | 210/751 |

FOREIGN PATENT DOCUMENTS

| | | | |
|---|---|---|---|
| 53-659 | 1/1978 | Japan | 210/751 |
| 54-121558 | 9/1979 | Japan | 210/768 |

OTHER PUBLICATIONS

Kuster, "Recycling Enhances Slurry Drying", Nov. 1987, pp. 87–89.

*Primary Examiner*—Neil McCarthy
*Assistant Examiner*—Theodore M. Green
*Attorney, Agent, or Firm*—Harrison & Egbert

[57] ABSTRACT

A process for treating a waste sludge of biological solids including the steps of mixing the sludge with an oxide-containing chemical and sulfamic acid so as to elevate a temperature of the sludge, pressurizing the mixed sludge to a pressure of greater than 14.7 p.s.i.a., and discharging the pressurized mixed sludge. The oxide-containing chemical can be either calcium oxide, potassium oxide, or potassium hydroxide. The sludge has a water content of between 5 and 85 percent. The oxide-containing chemical and the acid are reacted with the sludge so as to elevate the temperature of the sludge to between 50° C. and 450° C. The pressurized mixed sludge is flashed across a restricting orifice or passed into a chamber having a lower pressure. The evaporated liquid component can be condensed and used as part of the process. The oxide-containing chemical is mixed with the sludge in an amount between 5 and 50 weight percent of the sludge. The sulfamic acid is blended with the oxide-containing chemical in a weight ratio of between 0.33:1 and 1:1.

18 Claims, 1 Drawing Sheet

5,635,069

PROCESS FOR TREATING A WASTE SLUDGE OF BIOLOGICAL SOLIDS

RELATED APPLICATIONS

The present application is a continuation-in-part of U.S. patent application Ser. No. 08/278,902, filed on Jul. 22, 1994, and entitled "PROCESS FOR TREATING A WASTE SLUDGE", abandoned.

TECHNICAL FIELD

The present invention relates to processes for the treatment of waste sludges. More particularly, the present invention relates to processes that render biological waste sludges pathogen-free, vector-free, and sellable.

BACKGROUND ART

In the past, various techniques have been developed for the purpose of sterilizing or decontaminating biological sludges and wastes. The most common process is the process of mixing lime with the sludge. The reaction of lime with the water in the sludge serves to elevate the temperature of the sludge for a maximum of 100° C.

U.S. Pat. Nos. 4,781,842 and 4,902,431, issued to Nicholson, teach a process to decontaminate wastewater sludge to a level that meets or exceeds U.S. EPA process standards. The process mixes sludge with an alkaline material sufficient to raise the pH of the end product to 12 or higher for at least one day. This process will raise the temperature to 50° C., but will not sterilize the sludge, nor does it eliminate the pathogenic microorganisms.

U.S. Pat. No. 4,306,978, issued to Wurtz, relates to a process of lime stabilization of wastewater treatment plant sludge. This patent discloses the dewatering of the sludge and intimately mixing calcium oxide to raise the temperature so as to produce a stabilized sludge particle.

None of these prior art inventions are capable of achieving temperatures, when mixed the sludge, of greater than 100° C. None of these prior art techniques allow for the shorter drying times as required by 40 C.F.R. Subchapter O, Part 503.32 a.311.A–D. The shorter drying times, as required by this Subchapter, are in accordance with the following formula:

$$D = 131{,}700{,}000/(1 \times 10^{**}0.14t) \quad (1)$$

where

D=time in days t=temperature in degrees Celsius

It is an object of the present invention to provide a process for rendering a biological waste sludge pathogen-free and vector-free.

It is another object of the present invention to provide a process that converts the biological waste sludge into a sellable end product.

It is still a further object of the present invention to provide a process that eliminates or reduces waste incineration and landfilling of waste sludges.

It is another object of the present invention to provide a process that eliminates the odors resulting from lime stabilization.

It is still a further object of the present invention to provide a process that facilitates the dewatering of the biological sludge.

It is still another object of the present invention to provide a process that recycles waste heat.

It is still a further object of the present invention to provide a process for treating waste sludges that is cost effective, easy to use, and easy to install.

These and other objects and advantages of the present invention will become apparent from a reading of the attached specification and appended claims.

SUMMARY OF THE INVENTION

The present invention is a process for treating a waste sludge of biological solids which comprises the steps of: (1) mixing the sludge with an oxide-containing chemical and sulfamic acid; (2) reacting the sludge with the oxide-containing chemical and the sulfamic acid so as to elevate a temperature of the sludge to between 50° C. and 450° C.; (3) pressurizing the sludge to a pressure of greater than 14.7 p.s.i.a., and (4) passing the pressurized mixed sludge to a flashing chamber having a pressure of less than 14.7 p.s.i.a. The oxide-containing chemical can be either calcium oxide, potassium oxide, or potassium hydroxide.

The biological sludge should have a water content of between 5 and 85 percent. The oxide-containing chemical is mixed with the sludge in an amount of between 5 and 50 weight percent of the sludge. The sulfamic acid is mixed with the oxide-containing chemical in a ratio of between 0.33:1 and 1:1. In the preferred embodiment of the present invention, the oxide-containing chemical is calcium oxide.

During the process of discharging the reacted sludge, the reacted sludge is flashed across a restricting orifice. This causes the liquid component of the sludge to be evaporated. The evaporated liquid component is then passed to a condenser, which condenses the evaporated liquid component. This condensed evaporated liquid component can then be transferred to the mixed sludge. Alternatively, the evaporated liquid component can be vented to a scrubber. The scrubber can serve to remove pollutants and odors from the evaporated liquid component. The flashed mixed sludge can be discharged for disposal, as desired.

DETAILED DESCRIPTION OF THE INVENTION

Figure 1:
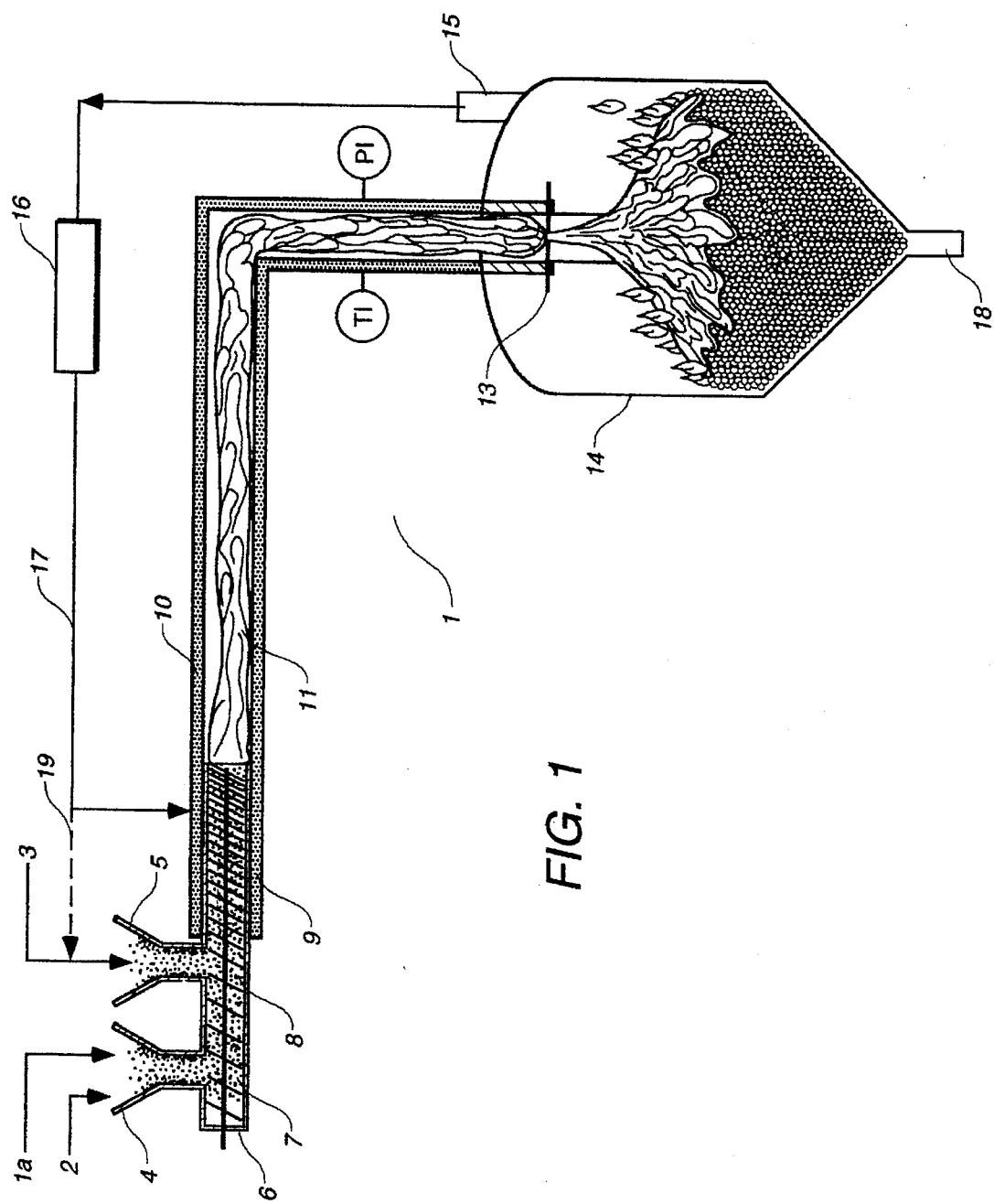
FIG. 1 is a flow diagram showing the process of the present invention for the treatment of waste sludges.

Referring to FIG. 1, there is shown at 1 the process for the treatment of a waste sludge of biological solids in accordance with the preferred embodiment of the present invention. In the process 1 of the present invention, the sludge 1a and the sulfamic acid 2 are delivered together into a feed hopper 4. Within the concept of the present invention, the sludge 1a is a waste sludge, including sewage sludges and animal feces. The sludge 1a will have a water content of between 5 percent and 85 percent. It is important for the sludge 1a to have a water content so that the remaining chemicals can properly react with the sludge. As such, the sludge 1a should not be dewatered prior to treatment.

The sulfamic acid 2 is otherwise known as amidosulfonic acid ($H_3NO_3S$). Sulfamic acid is obtained from chlorosulfonic acid and ammonia or by heating urea with $H_2SO_4$. Typically, sulfamic acid is used in acid cleaning, in nitrite removal, and in chlorine stabilization for use in swimming pools, cooling towers, and paper mills.

After the sludge 1a and the acid 2 are added together into the feed hopper 4, the mixture is auger fed into the feed section 7 of a screw conveyor 6. The screw conveyor 6 will rotate so as to transport the mixture of the sludge and the acid to a feed section. During the transport of the mixture of the sludge 1a and acid 2, these materials are mixed together by the screw conveyor.

At the feed section 8, an oxide-containing chemical 3 is added to the feed section. In particular, the oxide-containing chemical is delivered to the feed hopper 5 and auger delivered to the feed section 8. As used in the present invention, the oxide-containing chemical can be either calcium oxide, potassium oxide, or potassium hydroxide. In the preferred embodiment of the present invention, the oxide-containing chemical should be calcium oxide. Other ingredients can be added to the feed section 8, if desired. These other ingredients can be passed along with the oxide-containing chemical 3 or otherwise delivered into the feed section. These materials are then transported to the compression zone 9 of the screw conveyor 6. This compression zone serves to increase the pressure of the mixed sludge to the desired value. Specifically, the compression zone 9 should increase the pressure of the mixed sludge to pressure of greater than 14.7 p.s.i.a. Experimentation has found that the desired effects of the present invention are achieved by pressurizing the mixed sludge to a pressure of between 14.7 p.s.i.a. and 120 p.s.i.a.

The adding of the calcium oxide to the mixture and the increasing of the pressure through the motive force of the screw conveyor 6, causes an exothermic reaction along the reaction section 11. The combination of the calcium oxide and the water within the waste sludge produces $Ca(OH)_2$ and liberates 235 Kcal/mole of heat. This raises the temperature from ambient to 100° C. in 0.5 seconds. The sulfamic acid 2 then reacts with the $Ca(OH)_2$ to form calcium salts. This raises the temperature from 100° C. to 140° C. in less than one second.

In the present invention, the oxide-containing chemical can be either potassium hydroxide, potassium oxide, or calcium oxide produced from any source, such as kiln dust or lime dust. This material will make up between 5 percent and 50 percent of the waste sludge 1a by weight. Sulfamic acid 2 can be added, in any form, whereby the weight ratio of acid to the oxide-containing chemical is between 0.33:1 and 1:1. In general, the temperature of the reaction with the reaction chamber 11 will be between 50° C. and 450° C. The time of this reaction can be carried out for a period of time of between and one second and twenty minutes.

The material which exits the screw conveyor 6 enters an reaction chamber 11 having insulation 10. This reaction chamber 11 can contain static mixing elements. The material is continuously mixed as it progresses through the predetermined length of pipe. The material is continuously under pressure so as to prevent a premature flashing of the water. If flashing would occur, then the water content of the sludge would decrease during this stage and could cause the solidification of the sludge within the chamber 11. A temperature monitor TI and a pressure monitor PI are provided along the reaction chamber 11 so as to provide monitoring of the reaction process and can provide for suitable reaction control systems.

After reacting, the material is flashed across a restricting orifice 13. This restricting orifice can be an opening, a die, or a valve. This orifice 13 is positioned generally adjacent the end of the reaction chamber 11. The orifice 13 will communicate with a flash chamber 14. As such, the material is delivered under pressure to the orifice and then released into the flash chamber 14. A vapor, including water vapor, $NH_3$, $SO_2$, and $SO_3$, will exit the flash chamber 14 through the vent 15. This vapor will then pass through a condenser, or compressor 16 and be either reintroduced to the process through line 17 or into the feed hopper 5 through line 19. The reintroduction of such vapor can add nutrient value to the material.

In order to properly remove the water from the sludge, it is important that the flash chamber has an interior pressure of between 0 and 14.7 p.s.i.a. As such, when the mixed sludge passes through the orifice 13, the sludge will be exposed to a lesser pressure. This causes the water and other volatile components of the sludge to be evaporated. As a result, the water content and the temperature of the sludge are appropriately reduced. The heat of vaporization of the flashed material can be passed directly back to the sludge by using heat exchangers, pumps, or vapor compressors. After the sludge passes into the flash chamber 14, the resulting sludge will be a sterile, decontaminated product which is pathogen-free and vector-free. This product will meet or exceed U.S. EPA standards.

The sterilized sludge then exits the flash chamber 14 through the discharge opening 18. The resulting sterilized sludge can be either packaged or hauled to a disposal site. The sterilized sludge can be applied to land as a soil conditioner and as a fertilizer supplement. Potassium oxide, potassium hydroxide, or any other soil conditioning materials, can be added to the sludge such that the added material does not hinder the reaction.

The geometric configuration of the reaction chamber 11 is, of course, dependent upon the layout configuration of the facility in which it is used. The reaction chamber 11 should include insulation 10 so as to eliminate heat loss and to produce an adiabatic reaction.

Tests have been conducted with the configuration of the present invention. The experimental data associated with the process of the present invention is identified in Table I hereinbelow. During these experiments, oxalic acid was included in the experiments. However, it was later determined that the oxalic acid is a temperature depressor and can be a poison. As such, oxalic acid should not be included as part of the process of the present invention. Other test results have shown that acids such as $HNO_3$ acid, acetic acid, and vinegar acid do not achieve the necessary reaction so as to significantly increase the temperature of the waste sludge.

TABLE I

| EXP # | CaO gr. | OXALIC ACID gr. | SULFAMIC ACID gr. | WATER cc. | TEMP F. | TIME TO REACH TEMP mins. |
|---|---|---|---|---|---|---|
| 1 | 189 | 75 | 56 | 24 | 300 | 8 |
| 2 | 189 | 75 | 112 | 24 | 807 | 8 |
| 3 | 337 | 153 | 224 | 24 | 618 | 8 |
| 4 | 337 | 306 | 112 | 24 | 580 | 4 |
| 5 | 189 | 75 | 168 | 24 | 400 | 1 |
| 6 | 189 | 75 | 112 | 24 | 667 | 5 |
| 7 | 50 | 40 | 87 | 24 | 250 | 1 |
| 8 | 169 | 0 | 130 | 24 | 840 | 1 |

TABLE I-continued

| EXP # | CaO gr. | OXALIC ACID gr. | SULFAMIC ACID gr. | WATER cc. | TEMP F. | TIME TO REACH TEMP mins. |
|---|---|---|---|---|---|---|
| 9  | 169 | 130 | 0   | 24 | 370 | 1   |
| 10 | 169 | 0   | 0   | 12 | 213 | 0.2 |
| 11 | 0   | 75  | 0   | 12 | 0   | 1   |
| 12 | 0   | 0   | 50  | 12 | 0   | 1   |
| 13 | 169 | 130 | 0   | 24 | 500 | 3   |
| 14 | 169 | 0   | 130 | 24 | 620 | 1   |
| 15 | 85  | 0   | 55  | 24 | 700 | 1   |
| 16 | 169 | 0   | 130 | 24 | 750 | 1   |
| 17 | 169 | 0   | 130 | 72 | 750 | 1   |
| 18 | 169 | 0   | 188 | 24 | 860 | 1   |

The foregoing disclosure and description of the invention is illustrative and explanatory thereof. Various changes in the details of the described process may be made within the scope of the appended claims without departing from the true spirit of the invention. The present invention should only be limited by the following claims and their legal equivalents.

We claim:

1. A process for treating a waste sludge of biological solids comprising the steps of:

blending the sludge with sulfamic acid, the sludge having a water content of less than 85 percent;

adding an oxide-containing chemical to the blended sludge so as to elevate the temperature of the sludge, said oxide-containing chemical selected from the group consisting of: calcium oxide, potassium oxide, and potassium hydroxide;

pressurizing the mixed sludge to a pressure of greater than 14.7 p.s.i.a.; and discharging the pressurized mixed sludge.

2. The process of claim 1, said step of mixing comprising the step of:

reacting said oxide-containing chemical and said acid with said sludge so as to elevate the temperature of the sludge to between 50° C. and 140° C.

3. The process of claim 2, said step of mixing comprising the step of:

mixing the sludge with said oxide-containing chemical and said acid during said step of reacting.

4. The process of claim 1, said step of pressurizing comprising:

pressurizing the mixed sludge to a pressure of between 14.7 p.s.i.a. and 120 p.s.i.a.

5. The process of claim 1, said step of discharging comprising:

flashing the pressurized mixed sludge across a restricting orifice; and evaporating a liquid component of said sludge.

6. The process of claim 5, further comprising the steps of:

passing the evaporated liquid component to a condenser; and condensing the evaporated liquid component.

7. The process of claim 6, further comprising the step of:

transferring the condensed evaporated liquid component to the mixed sludge.

8. The process of claim 5, further comprising the steps of:

venting the evaporated liquid component to a scrubber; and scrubbing pollutants from the evaporated liquid component; and transferring a reactant of said step of scrubbing to the mixed sludge.

9. The process of claim 5, further comprising the step of:

discharging the flashed mixed sludge for disposal.

10. The process of claim 1, said oxide-containing chemical being mixed with said sludge in an amount of between 5 and 50 weight percent of the sludge.

11. The process of claim 1, said acid blended with the oxide-containing chemical in a weight ratio of between 0.33:1 and 1:1.

12. The process of claim 1, said step of discharging comprising:

passing the pressurized mixed sludge to a chamber having a pressure of between 0 and 14.7 p.s.i.a.

13. The process of claim 1, said mixed sludge having a temperature of between 50° C. and 450° C., said mixed sludge being pressurized for a period of time of between one second and twenty minutes.

14. A process for treating a waste sludge of biological solids comprising the steps of:

mixing the sludge with an oxide-containing chemical and a sulfamic acid, said oxide-containing chemical selected from the group consisting of: calcium oxide, potassium oxide, and potassium hydroxide;

reacting the sludge with the oxide-containing chemical and the sulfamic acid so as to elevate the temperature of the sludge to between 50° C. and 450° C., the sludge having a water content of less than 85 percent;

pressurizing the sludge to a pressure of greater than 14.7 p.s.i.a.; and passing the pressurized mixed sludge to a flash chamber having a pressure of less than 14.7 p.s.i.a.

15. The process of claim 14, said sludge having a water content of between 5 and 85 percent, said oxide-containing chemical being between 5 and 50 weight percent of the sludge, said sulfamic acid mixed with said oxide-containing chemical in a ratio of between 0.33:1 and 1:1.

16. The process of claim 15, said oxide-containing chemical being calcium oxide.

17. The process of claim 14, further comprising the steps of:

flashing the pressurized mixed sludge across a restricting orifice;

evaporating a liquid component of the sludge; and discharging the flashed mixed sludge for disposal.

18. The process of claim 17, further comprising the steps of:

passing the evaporated liquid component to a condenser;

condensing the evaporated liquid component;

transferring the condensed evaporated liquid component to the mixed sludge.

* * * * *